(12) United States Patent
Hamrin et al.

(10) Patent No.: US 7,591,355 B2
(45) Date of Patent: Sep. 22, 2009

(54) DISCONNECT

(75) Inventors: John Edward Hamrin, Bemidji, MN (US); Brendan Reimer, Bagley, MN (US)

(73) Assignee: TEAM Industries, Inc., Bagley, MA (US)

( * ) Notice: Subject to any disclaimer, the term of this patent is extended or adjusted under 35 U.S.C. 154(b) by 402 days.

(21) Appl. No.: 11/513,313

(22) Filed: Aug. 30, 2006

(65) Prior Publication Data

US 2008/0053780 A1    Mar. 6, 2008

(51) Int. Cl.
*F16D 43/20*    (2006.01)
*F16D 27/115*    (2006.01)

(52) U.S. Cl. .................. 192/54.52; 192/54.4; 192/84.7; 192/84.91; 192/109 R

(58) Field of Classification Search ........... 192/84.7, 192/54.52
See application file for complete search history.

(56) References Cited

U.S. PATENT DOCUMENTS

| | | | |
|---|---|---|---|
| 4,718,303 A | 1/1988 | Fogelberg | |
| 5,199,538 A | 4/1993 | Fischer et al. | |
| 5,884,738 A * | 3/1999 | Joslin et al. | 192/35 |
| 6,176,800 B1 | 1/2001 | Shaffer et al. | |
| 6,349,809 B1 * | 2/2002 | Isley, Jr. | 192/35 |
| 6,461,267 B1 | 10/2002 | Paielli | |
| 6,474,433 B1 | 11/2002 | Yoshioka | |
| 6,561,332 B2 | 5/2003 | Organek et al. | |
| 6,585,094 B2 * | 7/2003 | Okude et al. | 192/35 |
| 6,607,062 B1 | 8/2003 | Heatwole et al. | |
| 6,666,315 B2 * | 12/2003 | Organek et al. | 192/84.7 |
| 6,733,411 B1 | 5/2004 | Kaplan et al. | |
| 6,755,764 B2 | 6/2004 | Okazaki | |
| 6,832,972 B2 | 12/2004 | Ishikawa | |
| 6,902,506 B2 | 6/2005 | Schrand | |
| 6,904,992 B2 | 6/2005 | Miguchi | |
| 6,962,226 B2 | 11/2005 | Goto et al. | |
| 2002/0012598 A1 | 1/2002 | Morse et al. | |
| 2003/0066727 A1 * | 4/2003 | Suzuki | 192/35 |
| 2005/0261101 A1 | 11/2005 | Yoshioka | |

FOREIGN PATENT DOCUMENTS

EP    0 350 068 B1    3/1993

* cited by examiner

*Primary Examiner*—Rodney H Bonck
(74) *Attorney, Agent, or Firm*—IPLM Group, P.A.

(57) ABSTRACT

A disconnect (128) is provided for use between an engine (126) and differential (130). The differential disconnect (128) provides for a lock out of the disconnect (128) so as to prevent self energizing. The differential may also include a bottom-out feature to limit the amount of torque that may be transferred through the disconnect. In addition, the disconnect (128) may include a design to contain axial forces on the input shaft (14).

9 Claims, 10 Drawing Sheets

DISCONNECT

BACKGROUND OF THE INVENTION

1. Field of the Invention

This invention relates generally to all terrain or utility vehicles and, in particular, to a disconnect for use with an all terrain or utility vehicle having selectable drive configurations.

2. Description of the Prior Art

Control of drive configurations or characteristics of all terrain or other types of utility vehicles can be unique to such vehicles. Such vehicles are often capable of being driven over uneven or hilly terrain. Such vehicles are often capable of encountering soft, loose or slippery soils as well as snow and/or ice.

A driver of such a vehicle typically operates the vehicles from a centrally located seat location using handlebars to control the steering of the vehicle, typically accomplished by turning the front wheels with respect to the body of the vehicle.

Optimum drive characteristics for these vehicles often vary from rear-wheel drive, front-and rear-wheel drive and all-wheel drives. In a typical rear-wheel drive configuration, only the rear wheels propel the vehicle. The rear wheels may be rotationally coupled allowing both rear wheels to provide traction. In front-and rear-wheel drive configurations (sometimes simply referred to as four-wheel drive), the rear wheels and at least one of the front wheels provide traction. In all-wheel drive configurations, the rear wheels and both front wheels provide traction.

The drive configuration is fixed for some prior art systems. That is, the drive configuration cannot be changed, e.g., from rear-wheel drive to all-wheel drive. In other prior art systems, the drive configuration can be selected by the operator.

The present invention provides for a disconnect that may be utilized between the engine and transmission and the front differential to provide for a different configuration.

SUMMARY OF THE INVENTION

In one embodiment the invention is a disconnect for use between an engine and a differential. The disconnect includes an input shaft and a pinion shaft. An electromagnet is positioned around the input shaft. An armature plate is positioned around the input shaft and is moveable, by the electromagnet, between an engaged position and a disengaged position. A converter mechanism changes relative rotational movement to axial movement. The converter mechanism includes a first member operatively connected to an input shaft, wherein the first member rotates at the same speed as the input shaft. A second member is operatively connected to the pinion shaft and rotates at the same speed as the pinion shaft, wherein a rotational difference between the speed of the input shaft and the pinion shaft results in axial movement of the second member. A biasing member biases the armature plate to the disengaged position. A locking member is provided for locking the armature pate to the first member, when in the disengaged position. The second member is operatively connected to the armature plate, wherein the armature plate and the second member rotate at the same speed, wherein the converter is prevented from self energizing.

In another embodiment, the invention is a disconnect for use between an engine and a differential. The disconnect includes an input shaft and a pinion shaft. A converter mechanism is provided for changing relative rotational movement to axial movement. The converter mechanism includes a first member operatively connected to the input shaft, wherein the first member rotates at the same speed as the input shaft. A second member is operatively connected to the pinion shaft and rotates at the same speed as the pinion shaft, wherein a differential rotation between the speed of the input shaft and the pinion shaft results in axial movement of the second member. A plurality of reaction plates are operatively connected to the pinion shaft. A plurality of friction plates are operatively connected to the second member. The input shaft has a first diameter and a second, larger diameter. The second member has an end wall, wherein axial movement of the second member compress the friction and reaction plates and transfers torque to the pinion shaft and axial movement of the second member is limited by the end wall contacting the larger diameter of the input shaft.

In another embodiment the invention is a differential disconnect for use between an engine and a differential. The disconnect includes an input shaft and a pinion shaft. A converter is provided for changing a relative rotational movement to axial movement. The converter includes a first member operatively connected to the input shaft, wherein the first member rotates at the same speed as the input shaft. A second member is operatively connected to the pinion shaft and rotates at the same speed as the pinion shaft, wherein a differential rotation between the speed of the input shaft and the pinion shaft results in axial movement of the second member. A plurality of reaction plates are operatively connected to the pinion shaft. A plurality of friction plates are operatively connected to the second member. A retaining ring is operatively connected to the input shaft and is positioned to receive axial forces on the first member generated by differential rotation of the first and second members. A reaction disk is positioned proximate the friction and reaction plates. An end-of-shaft feature is operatively connected to the input shaft, the end-of-shaft feature receives axial forces from a reaction disk, wherein axial forces generated are all on the input shaft.

DETAILED DESCRIPTION OF A PREFERRED EMBODIMENT

Figure 1:
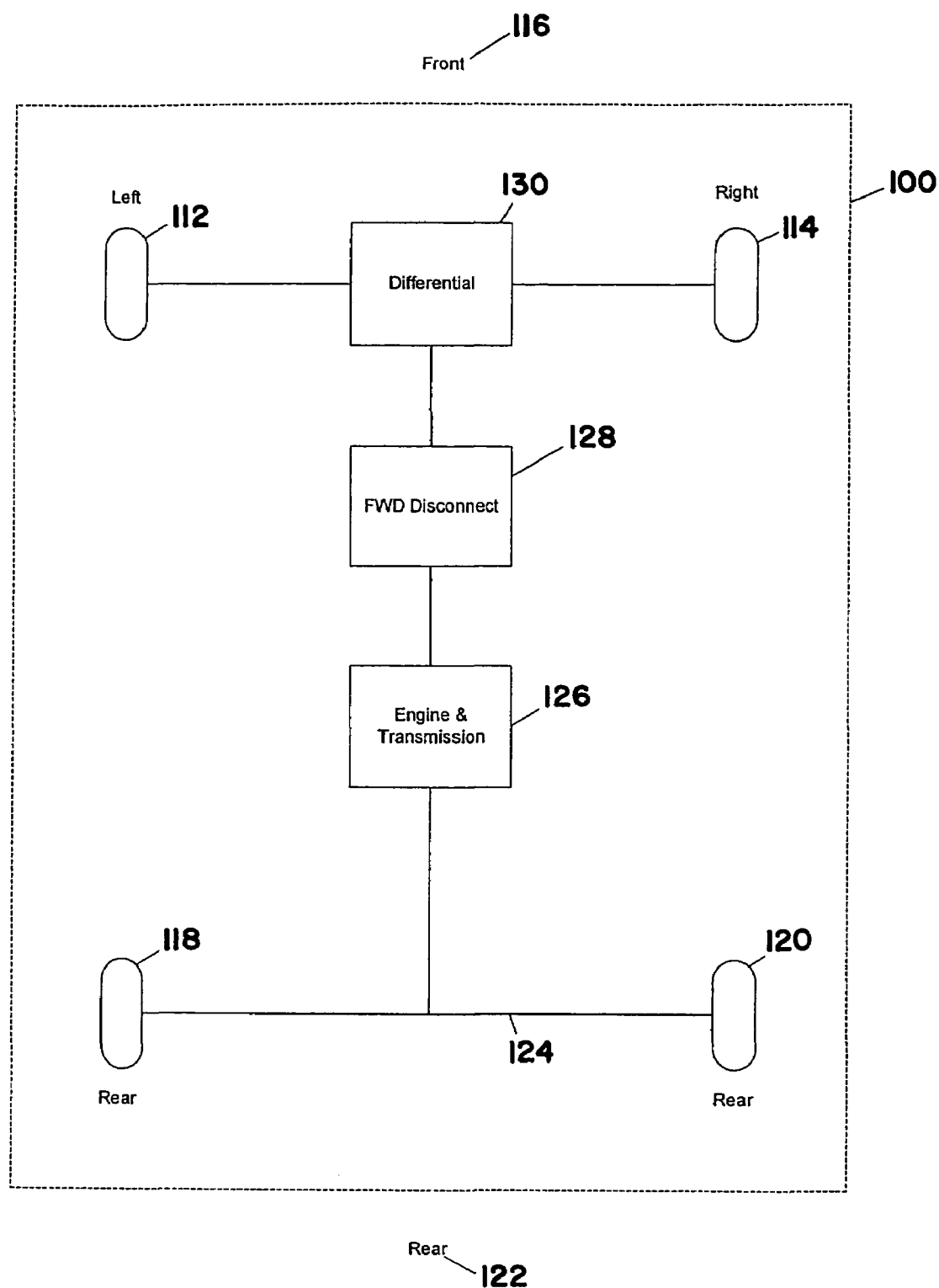
FIG. 1 is a diagrammatic block diagram of an all-terrain or utility vehicle.

In FIG. 1*a*, an all-terrain vehicle 100 is shown in diagrammatic form. Such all-terrain or utility vehicles are often capable of being driven over uneven or hilly terrain and are often capable of encountering soft, loose or slippery soils as well as snow and/or ice. While these vehicles are described as being all-terrain or utility vehicles, it is recognized and understood that other terms may be used to refer to such vehicles. Generally, a driver of such a vehicle typically operates the vehicle from a somewhat centrally located seat location using either handlebars or a steering wheel to control the steering of the vehicle, typically accomplished by turning the front wheels with respect to the body of the vehicle.

The vehicle 100 has a left front wheel 112 and a right front wheel 114 generally located toward the front 116 of the vehicle 100. Together, the left front wheel 112 and right front wheel 114 make up the left and right front wheels of the vehicle 100. Vehicle 100 also has a left rear wheel 118 and a right rear wheel 120 generally located toward the rear 122 of the vehicle 100. Together, the left rear wheel 118 and right rear wheel 120 make up the left and right rear wheels of the vehicle 100.

In a preferred embodiment, left rear wheel 118 and right rear wheel 120 are rotationally tied together by axle 124. Motive power to left and right rear wheels 118 and 120 is provided by engine and transmission 126 coupled conventionally to axle 124.

Engine 126 may also be coupled to the left and right front wheels 112 and 114 through a front wheel drive disconnect 128 and differential 130. While not shown, it is also understood that a differential may be utilized between the rear wheels 118 and 120. The front wheel disconnect 128 allows vehicle 100 to have a plurality of handling configurations.

The front wheel drive disconnect may be operated manually or electronically controlled.

Referring now to FIGS. 2-6, there is shown in more detail the front-wheel drive disconnect 128. The disconnect 128 includes an outer housing 16 that is generally cylindrical in shape. Positioned in the outer housing 16 is a clutch basket 11. The clutch basket 11 has a cylindrical body 11a with a front face 11b. The cylindrical body 11a has a plurality of rectangular slots 11c formed around its outer periphery. A pinion mounting cylinder 11d is operatively connected to the front face 11b and preferably an integral portion thereof. The pinion mounting cylinder 11d has a plurality of splines 11e formed along its inner bore. The splines are adapted and configured to receive splines 13a which are formed on the outer periphery on the shaft 13b of pinion 13. The pinion 13 has a pinion gear 13c at its end opposite the splines 13a. The pinion gear 13c is adapted and configured to be operatively connected to the front differential 130, by means well known in the art. The clutch basket 11 is preferably of a ferrous material. A collar 15, preferably of a non-ferrous material and acting as a magnetic insulator, has a cylindrical body 15a with a plurality of tabs 15b. The tabs 15b are generally rectangular and are sized and configured to be inserted in the slots 11c, thereby coupling the clutch basket 11 to the collar 15. A second set of generally rectangular tabs 15c are provided on the other side of the body 15a from the tabs 15b. The second set of tabs 15c are sized and configured to operatively connect the collar 15 to a rotor friction plate 19. The rotor friction plate 19 has a generally cylindrical body 19a that includes four segments interrupted by slots 19b. The slots 19b are sized and configured to receive the tabs 15c. It can therefore by seen that by the connections described thus far, the rotor 19 will rotate at the same speed as the pinion 13. The rotor friction plate 19 has a central hub 19c that has a bore in which a flanged bearing 12 is positioned. The flanged bearing 12 is preferably non-ferrous.

A flanged bearing 5 is positioned around the pinion mounting cylinder 11d. An input shaft 14 has a shaft body 14a that has a first set of splines 14b and a second set of splines 14c formed on its outer surface. An end cap or end of shaft feature 14d is operatively connected at one end of the shaft body 14a. The end cap has an end wall 14e operatively connected to a cylindrical member 14f which in turn is operatively connected to the shaft body 14a. A reaction disk 2 has a cylindrical body 2a that has a top surface 2b and a bottom surface 2c and an end plate 2d, all preferably formed as an integral unit. The end plate 2d has a central bore that rests on the end wall 14e of the shaft 14. Retaining ring 26 is positioned in a groove formed in the cylindrical member 14f and restrains movement of the reaction disk 2 and prevents the reaction disk 2 from moving to the left, as viewed in FIG. 3. Two Belleville springs 25 are positioned between the end plate 2d and the end wall 14e and provide for a resistance force for the movement of the reaction disk 2 in movement to the right, as viewed in FIG. 3.

Figure 2A:
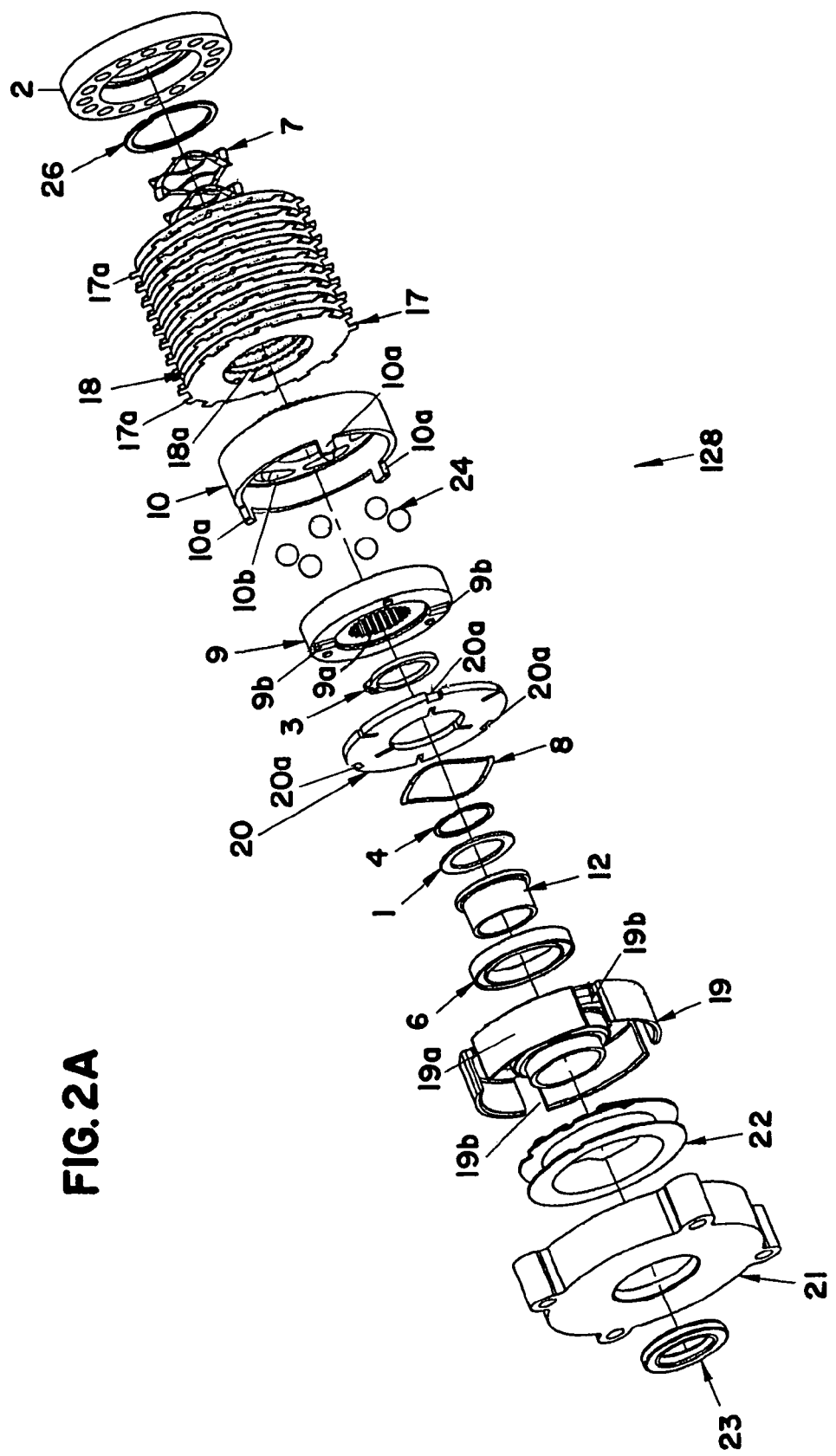
FIGS. 2A and 2B are exploded perspectives, that together form an exploded perspective view of an embodiment of a disconnect of the present invention, with reaction disk 2 repeated to show continuity between FIGS. 2A and 2B.
Figure 2B:
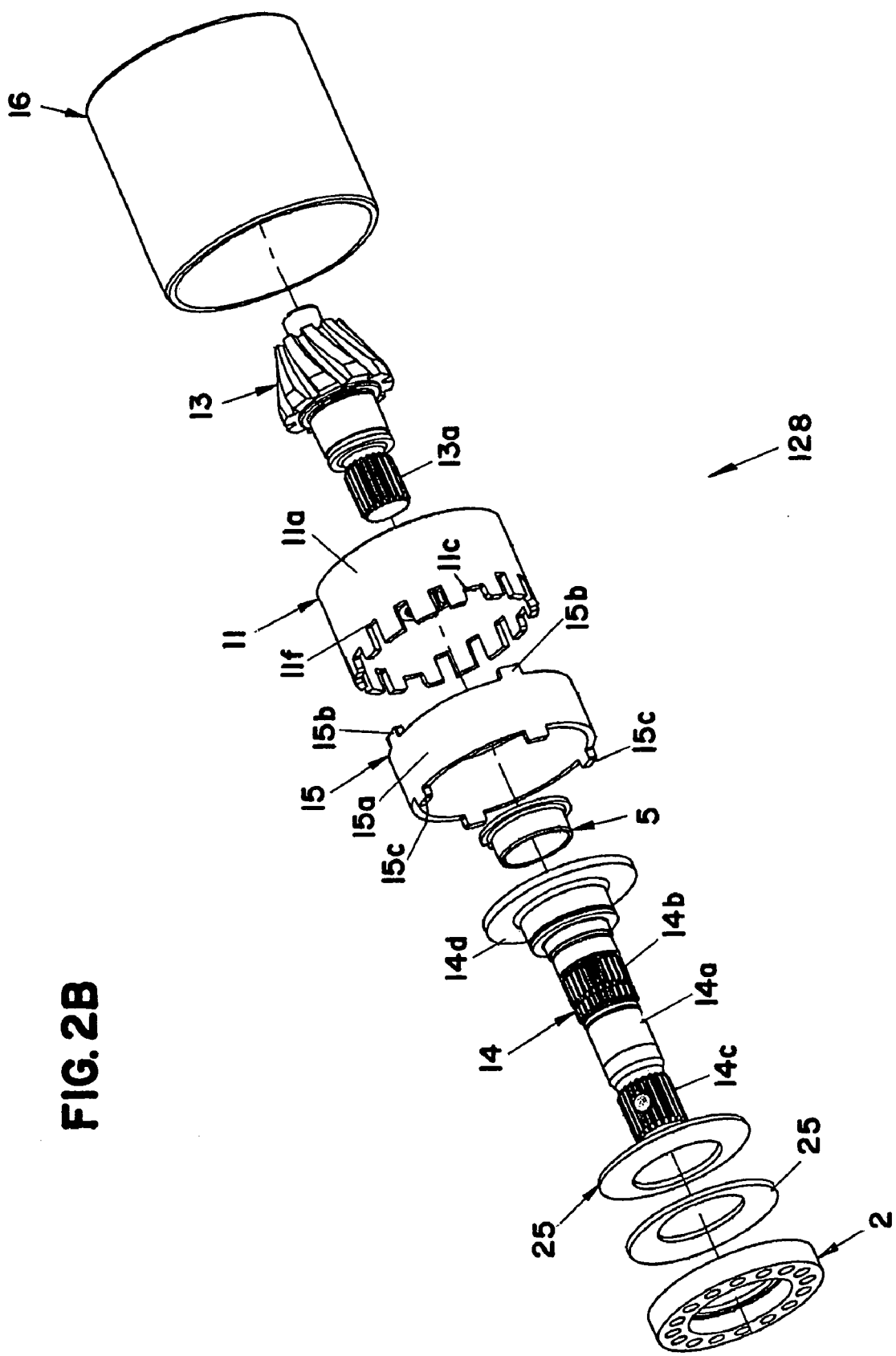
Figure 5:
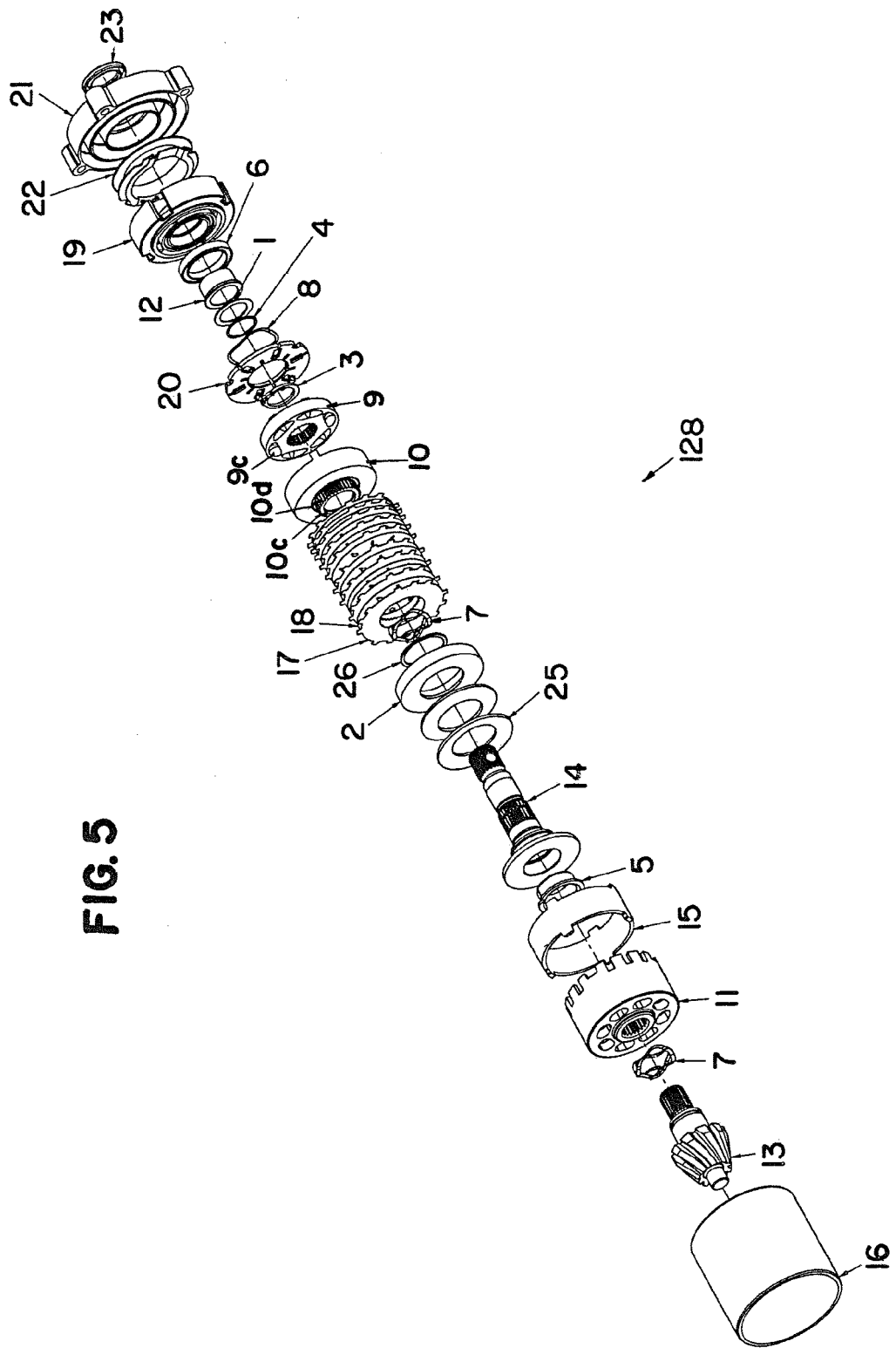
FIG. 5 is an exploded perspective view of the disconnect found in FIG. 2, viewed from the other side.

A ball ramp assembly includes a first ball ramp member 9, a second ball ramp member 10 and a plurality of roller balls 24 which are shown in FIG. 2A, but not shown in FIG. 5. While this assembly is being described with respect to a ball ramp assembly, it is also appreciated that other ways of converting relative rotational movement into axial movement may be utilized, such as by using face cams. The first ball ramp member 9 has a central bore through which a plurality of splines 9a is formed and operatively connected to the splines 14c, thereby tying the first ball ramp member 9 to the shaft 14. On a first side, two locking protrusions 9b are formed. The locking protrusions are generally rectangular in shape. On the other side of the first ball ramp member 9 are formed a plurality of ramps 9c. The ramps 9c are sized and configured to receive the roller balls 24. The second ball ramp member 10 has a generally cylindrical appearance and has three tabs 10a that extend generally horizontally. The tabs 10a are sized and configured to be received by slots formed in the armature plate 20, as will be described more fully hereafter. A plurality of elongate ramps 10b are formed in the second ball ramp member 12. These pockets are sized and configured to receive the roller balls 24. However, as is well known in the art, the ramps 10b have an incline surface and when there is relative rotation between the ball ramp members 9 and 10, this translates into linear movement of the second ball ramp member 10. On the other side of the ball ramp member 10 is a hub 10c. A plurality of splines 10d are formed along the outer surface of the hub 10c. A plurality of reaction plates 17 and friction plates 18 are positioned in alternating relationship with each other. The reaction plates 17 have tabs 17a. These tabs 17a are sized and configured to be received in a second set of slots 11f formed in the clutch basket 11. The reaction plates 18 have a plurality of splines 18a formed in their inner diameter. The splines 18a are adapted and configured to be received on the splines 10d of the second ball ramp member 10. A wave spring 7 is positioned between the ball ramp member 10 and a sidewall 14g of the cylindrical member 14f. Retaining ring 3 is positioned in a groove around the shaft 14 and will prevent movement of the first ball ramp member 9 from lateral movement to the left, as viewed in FIG. 3.

The armature plate 20 has a central bore for being positioned around the shaft 14. Three notches 20a are formed in the outer periphery. The notches 20a are sized and configured to receive the tabs 10a and tie the second ball ramp member 10 to the armature plate 20. The armature plate 20 is constructed of a ferrous material and is moveable along the shaft by an electromagnet, as will be described more fully hereafter.

An electromagnet includes an electromagnetic coil housing 21 and an electromagnetic coil bobbin 22, both positioned about the shaft 14 and the bobbin 22 inside of the coil housing 21. The rotor friction plate 19 likewise has a central bore on which it is positioned around the shaft 14. As previously described, the rotor 19 is tied to the collar 15 by tabs 15c. In addition, the rotor 19 is sized and shaped to focus the magnetic field of the electromagnet onto the armature plate 20.

A thrust washer 1 is positioned between the end of the flanged bearing 12 and the retaining ring 4 which is positioned around the shaft 14. A wave spring 8 is positioned around the shaft 14 and positioned between the armature plate 20 and the rotor 19. A seal 23 is positioned around the shaft 14 and the opening formed in the electromagnetic coil 21.

Figure 6:
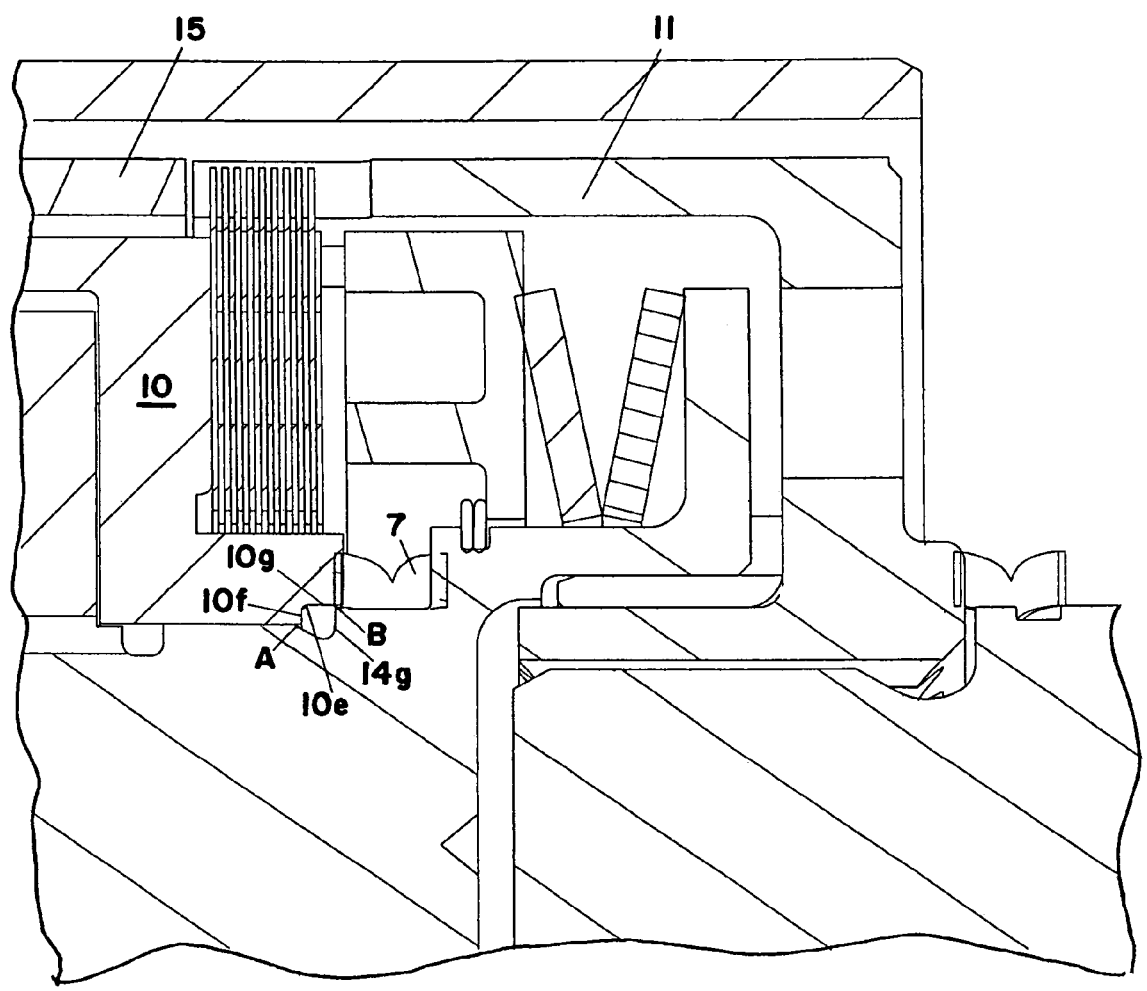
FIG. 6 is an enlarged view of a portion of the cross-sectional view shown in FIG. 3.

Referring now to FIG. 6, a torque limiting function will be described. The second ball ramp member 10 moves axially along the shaft 14. The hub 10c has a bore that has a first diameter at position A, as shown in FIG. 6, and a larger diameter at position B. Similarly, the shaft 14 has a smaller diameter at position A and a larger diameter at position B. The change in diameter of the bore in the hub 10c, between positions A and B, forms a notch 10e. The notch has a vertical wall 10f and a horizontal wall 10g. The shaft 14 has a vertical end wall 14g. As the second ball ramp member 10 moves to the right, the end wall 10f will contact the end wall 14g and limit the amount of movement of the second ball ramp 10 and therefore, as will be described more fully hereafter, limit the torque transferred.

Figure 7:
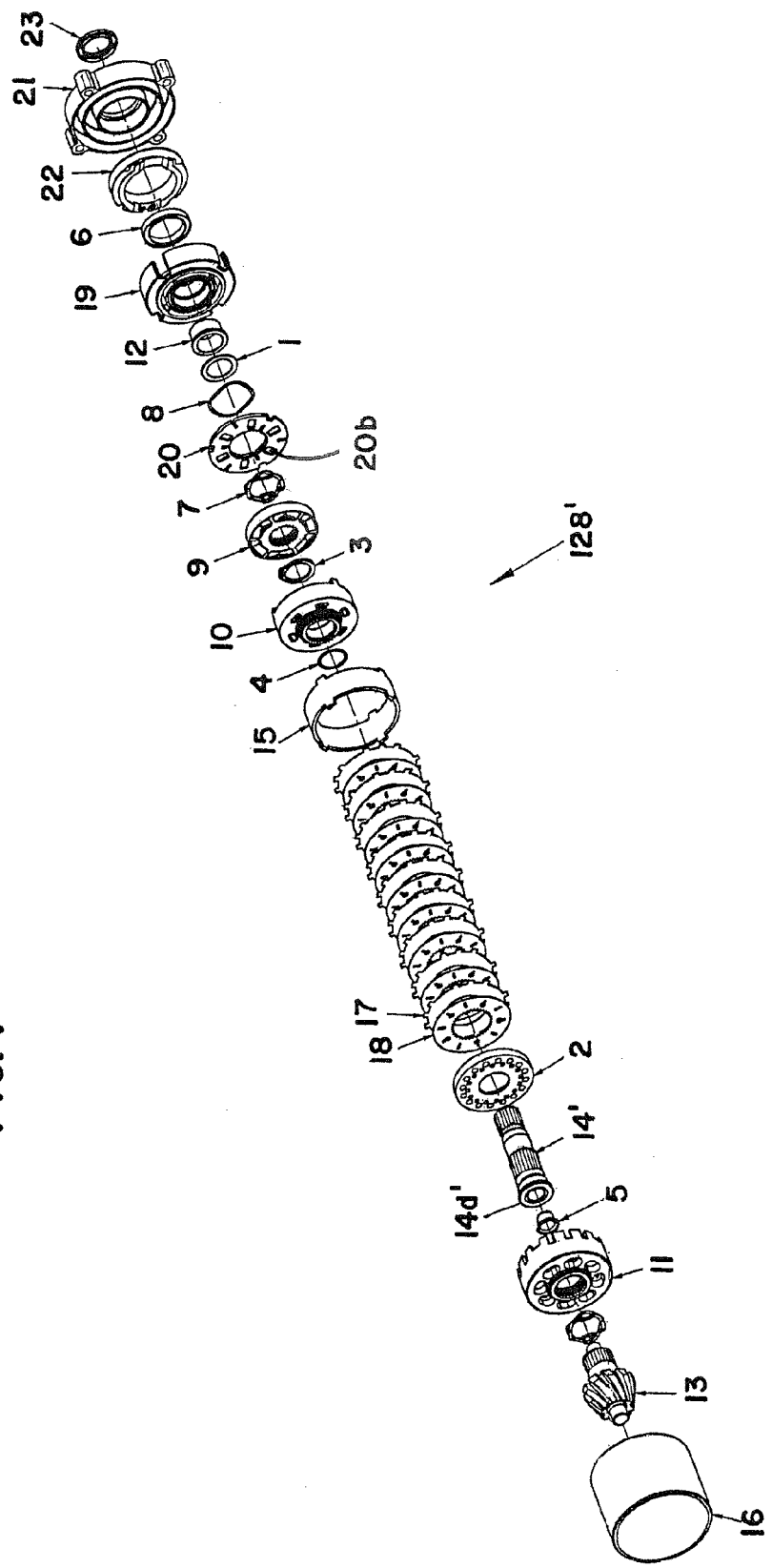
FIG. 7 is a perspective view of another embodiment of a disconnect.
Figure 8:
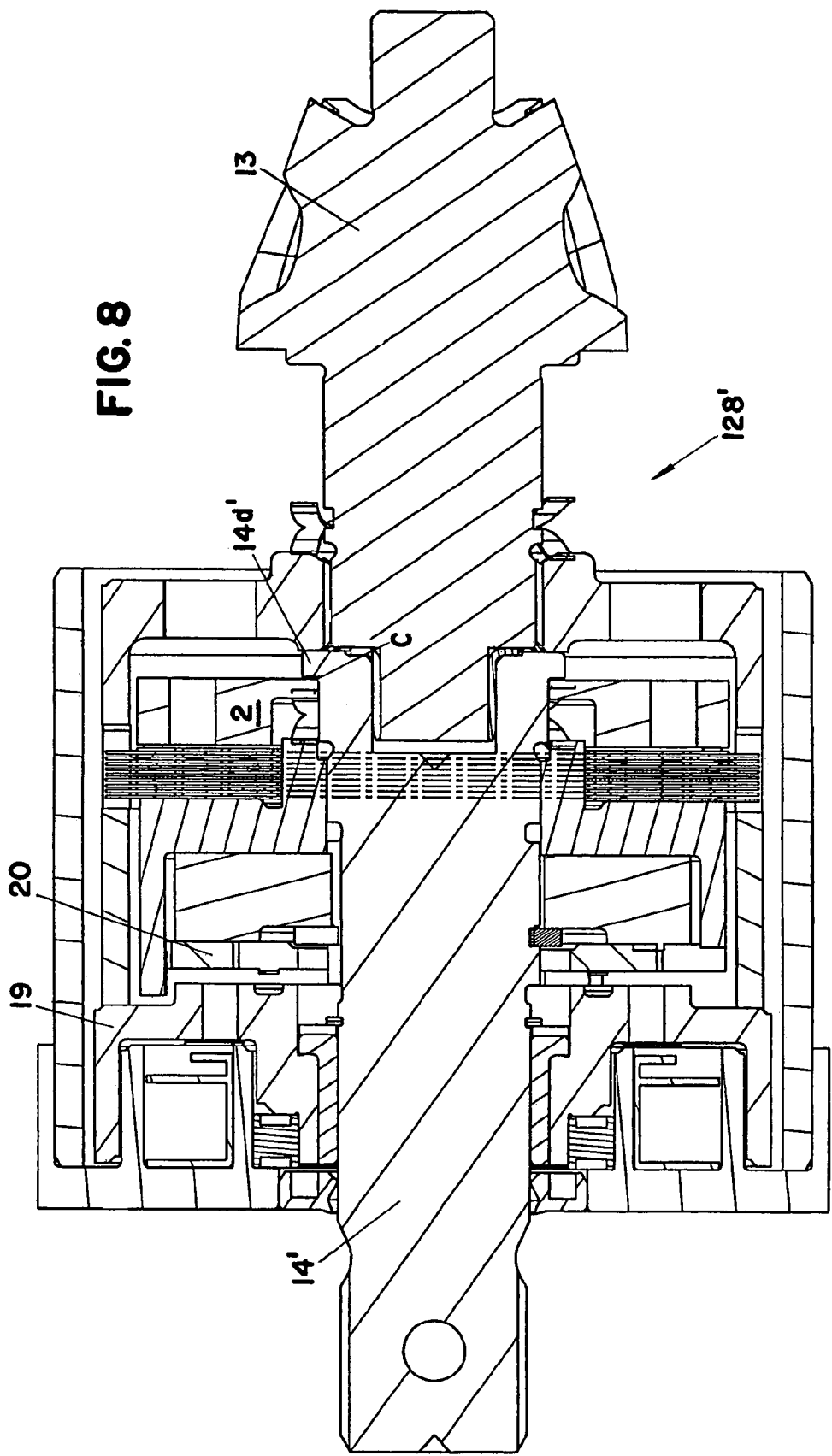
FIG. 8 is a cross-sectional view of the embodiment shown in FIG. 7 shown in the disengaged position.
Figure 9:
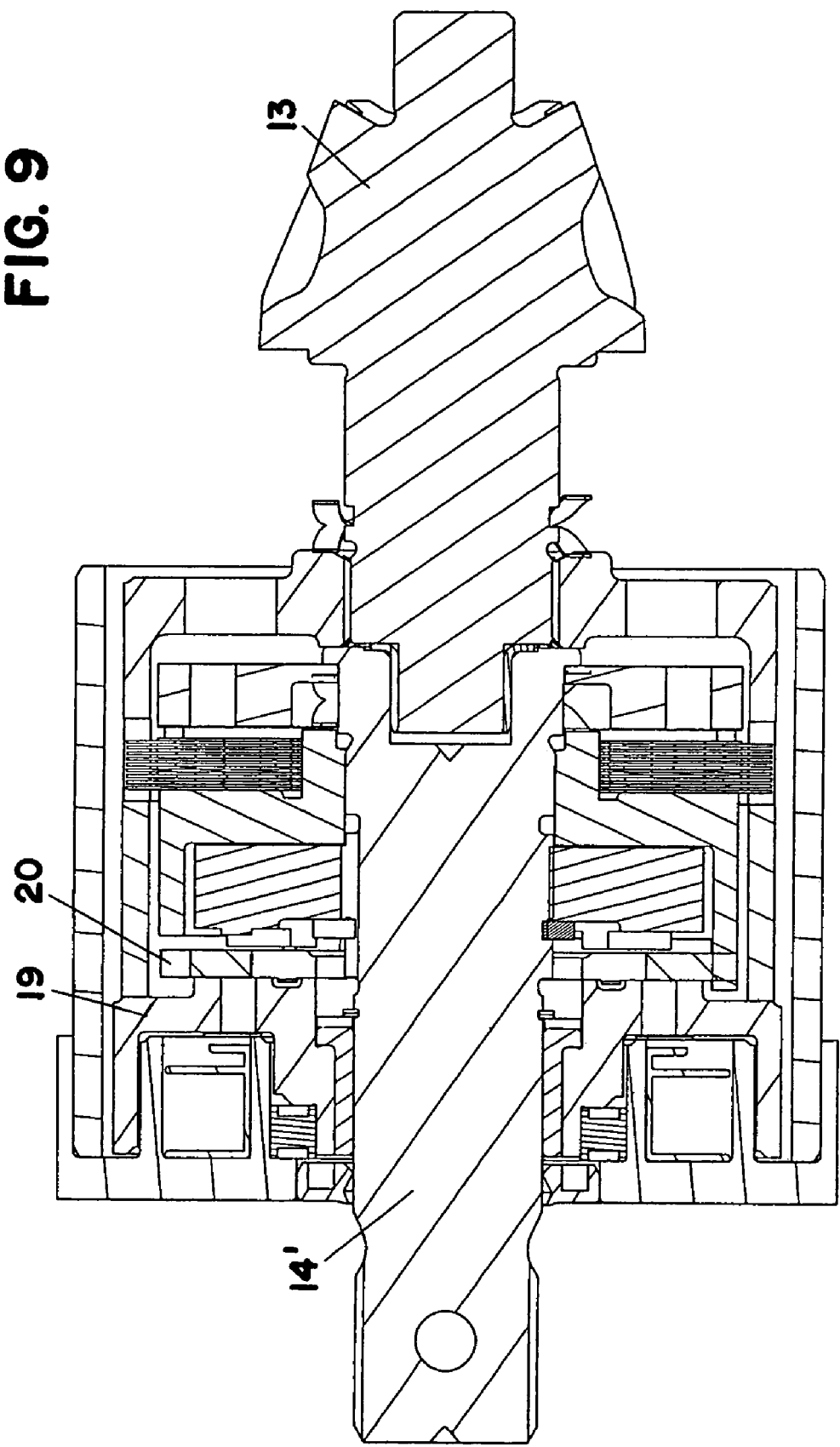
FIG. 9 is a cross-sectional view of the embodiment shown in the engaged position.

A second embodiment is shown in FIGS. 7-9. The second embodiment 128' is very similar to the first embodiment 128, with the exception that it does not have the torque limiting feature of the first embodiment. Therefore, the individual components will not be described in detail as they are the same. The difference between the second embodiment and the first embodiment is that there are no Belleville washers 25 and no snap ring 26. One additional difference is that the input shaft 14' has a slightly different configuration for its end feature. The end feature 14d' does not have as large of an end diameter as does the end feature 14d. There is no longer a need for a larger diameter to contain the Belleville washers, as there are no Belleville washers in this embodiment. The end feature 14d' provides a surface, as best shown in FIG. 8, to receive the axial forces generated through the reaction disk 2. This embodiment does not use the torque limiting feature, but is identical in the other respects. Accordingly, it will not be described in more detail.

Figure 4:
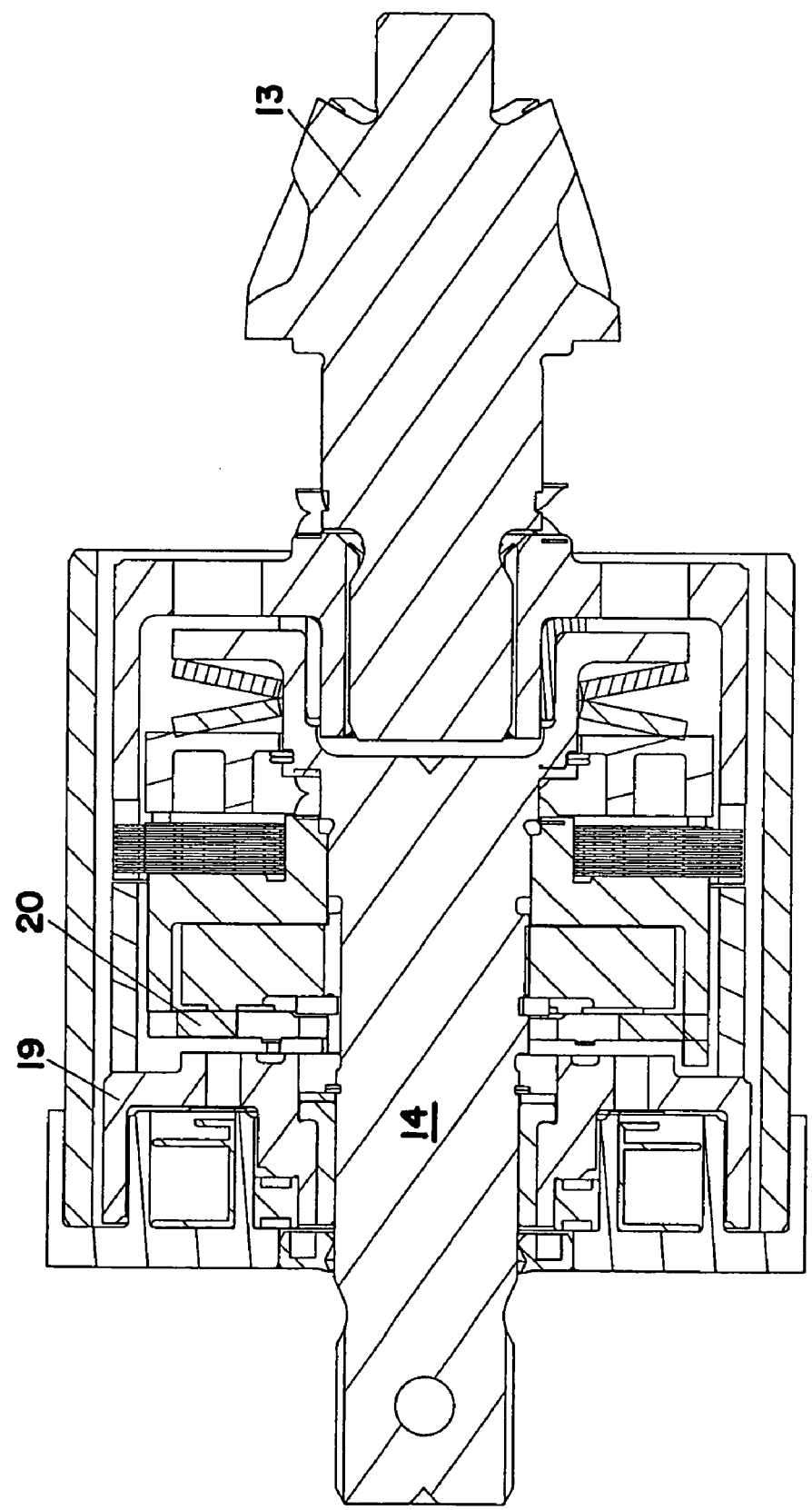
FIG. 4 is a cross-sectional view of the disconnect shown in FIG. 2, shown in an disengaged position.

In operation, if the electromagnetic 21 and 22 is not operational, the disconnect 128 is in a disengaged position, as shown in FIG. 4. Therefore if there is no electricity or there is a failure, the disconnect 128 is always disengaged. The spring 8 pushes the armature plate 20 against the first ball ramp member 9, thereby tying their rotations together as the protrusions 9b would be positioned in the pockets 20b. The pockets 20b are formed in the plate 20 and are sized and configured to receive the protrusions 9b.

When the electromagnet 21 and 22 is energized, either manually or automatically, the spring-loaded armature plate 20 is pulled to the left into contact with the rotor friction plate 19. Since the rotor friction plate 19 is at the same speed of rotation as the pinion 13 and the armature plate 20 is connected via tabs to the second ball ramp member 10, any relative rotation motion between the shaft 13 and the shaft 14 will cause the second ball ramp member 10 to rotate relative to the first ball ramp member 9. The first ball ramp member 9 is splined to the shaft 14. As is well-known in the art, the inclined or cam surface of the ramps 10b of the second ball ramp member 10 will results in linear movement of the second ball ramp member 10 and thereby exerting a force on the clutch pack, which includes the reaction plates 17 and friction plates 18. With this axial force, the plates 17 and 18 will begin to transmit torque. Since the transmitted torque will now dominantly travel through the ball ramps 9 and 10, the disconnect 128 will self energize. In other words, an increase in torque will cause an increase in axial force by the clutch pack. If the torque exceeds a predetermined amount, the axial force will exceed the preload force of the Belleville springs 25. When this free load force is exceeded, the reaction disk 2 will move to the right. However, the linear travel of the second ball ramp member 10 will be limited by the torque limiting function as previously described. That is, as the second ball ramp member 10 moves further to the right, the end wall 10f will contact end wall 14g and thereby limit the travel of the second ball ramp member 10. At this point, additional torque will not result in additional clutch pack force and slippage will occur. Thus torque can be limited, allowing the design of associated drive line components to be sized smaller, lighter and less costly than otherwise.

In the disengaged position, the armature plate 20 is held in position by the spring 8. This locks the two ball ramp members 9 and 10 together, preventing inadvertent engagement of the system. Without this lockout, at relatively high speeds in combination with cold (viscous oil), the friction plate 17 and 18 could cause engagement of the system without electrical power energizing the electromagnetic coil 21 and electromagnetic bobbin 22.

When the disconnect 128 is "on" or in the engaged position, this allows for the transmission of torque, but torque is only transmitted when there is a relative difference between the speeds of the shafts 13 and 14.

Figure 3:
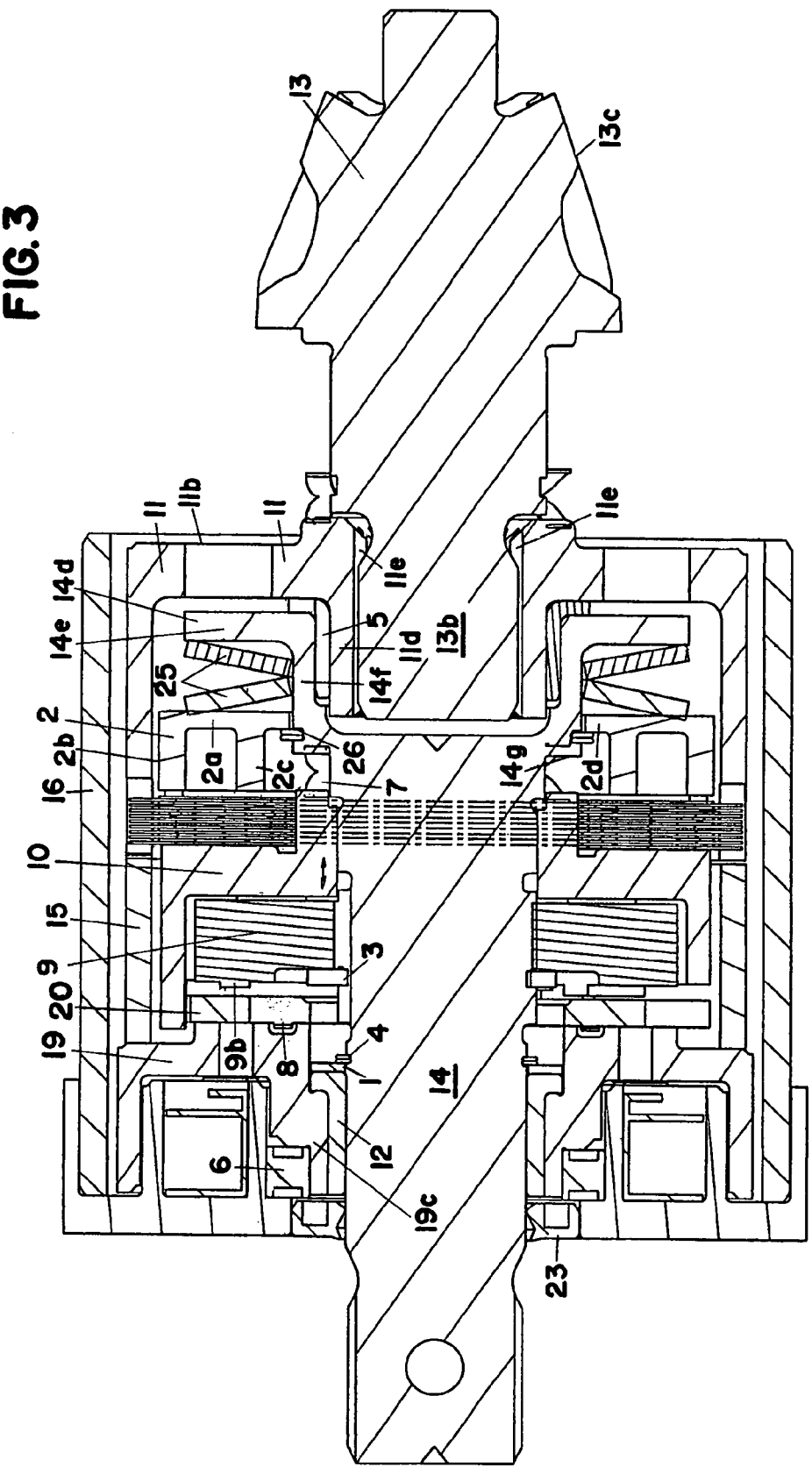
FIG. 3 is a cross-sectional view of the disconnect shown in FIG. 2, shown in an engaged position.

The present invention also provides for containing the axial forces on a single shaft. In the present invention, the shaft is the input shaft 14. Referring especially to FIG. 3, the retaining ring or snap ring 3 is operatively connected in a groove formed in the shaft 14. The retaining ring 3 is proximate the first ball ramp member 9 and receives axial forces from the first ball member 9 when there is relative rotation between the first and second ramp members 9 and 10. The end feature 14d is operatively connected to and integral with the shaft 14. The end feature 14 receives the axial forces from the Belleville springs 25. These include the preload forces of the Belleville springs 25 as well as forces generated by the movement of the reaction disk 2 as it moves with the linear movement of the second ball ramp member 10. Also, now referring to FIG. 6, the axial forces by the second ball ramp member 10 contacting the end wall 14g are likewise contained on the shaft 14.

Referring now to FIG. 8, there are two places for the axial forces. The first is retaining ring 3, which is the same as described with respect to the first embodiment. The second is the end feature 14d'. The end feature 14d' receives, at position C, the axial forces generated as a reaction disk 2 moves to the right. Again, the reaction forces are contained on the input shaft 14'.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A disconnect for use between an engine and a differential, the disconnect comprising:
   (a) an input shaft;
   (b) a pinion shaft;
   (c) an electromagnet positioned around the input shaft;
   (d) an armature plate positioned around the input shaft and moveable, by the electromagnet, between an engaged position and a disengaged position;

(e) a converter mechanism for changing relative rotational movement to axial movement, the converter mechanism comprising:
  (i) a first member operatively connected to the input shaft, wherein the first member rotates at a same speed as the input shaft; and
  (ii) a second member operatively connected to the pinion shaft and rotating at a same speed as the pinion shaft, wherein a differential rotation between the speed of the input shaft and the pinion shaft results in axial movement of the second member;
(f) a biasing member, biasing the armature plate to the disengaged position,
(g) a locking member for locking the armature plate to the first member, when in the disengaged position;
(h) the second member operatively connected to the armature plate, wherein the armature plate and second member rotate at a same speed, wherein the converter is prevented from self energizing.

2. The disconnect of claim 1, further comprising the converter is a ball ramp assembly.

3. The disconnect of claim 1, further comprising:
(a) a plurality of tabs operatively connected to the second member; and
(b) a plurality of slots formed in the armature plate, the slots adapted and configured to receive the tabs.

4. The disconnect of claim 3, further comprising:
(a) a protrusion operatively connected to the first member; and
(b) a pocket formed in the armature plate, the pocket sized and configured to receive the protrusion and lock the armature plate to the first member.

5. The disconnect of claim 4, further comprising:
(a) a plurality of reaction plates operatively connected to the pinion shaft;
(b) a plurality of friction plates operatively connected to the second member;
(c) the input shaft having a first diameter and a second, larger diameter; and
(d) the second member having an end wall, wherein axial movement of the second member compresses the friction and reaction plates and transfers torque to the pinion shaft and axial movement of the second member is limited by the end wall contacting the larger diameter of the input shaft.

6. The disconnect of claim 5, further comprising:
(a) a retaining ring operatively connected to the input shaft and positioned to receive axial forces on the first member generated by differential rotation of the first and second members;
(b) a reaction disk positioned proximate the friction and reaction plates; and
(c) an end of shaft feature operatively connected to the input shaft, the end of shaft feature receiving axial forces from the reaction disk, wherein axial forces generated are all on the input shaft.

7. A disconnect for use between an engine and a differential, the disconnect comprising:
(a) an input shaft;
(b) a pinion shaft;
(c) a converter mechanism for changing relative rotational movement to axial movement, the converter mechanism comprising:
  (i) a first member operatively connected to the input shaft, wherein the first member rotates at a same speed as the input shaft; and
  (ii) a second member operatively connected to the pinion shaft and rotating at a same speed as the pinion shaft, wherein a differential rotation between the speed of the input shaft and the pinion shaft results in axial movement of the second member;
(d) a plurality of reaction plates operatively connected to the pinion shaft;
(e) a plurality of friction plates operatively connected to the second member;
(f) the input shaft having a first diameter and a second, larger diameter;
(g) the second member having an end wall, wherein axial movement of the second member compresses the friction and reaction plates and transfers torque to the pinion shaft and axial movement of the second member is limited by the end wall contacting the larger diameter of the input shaft.

8. A disconnect for use between an engine and a differential, the disconnect comprising:
(a) an input shaft;
(b) a pinion shaft;
(c) a converter mechanism for changing relative rotational movement to axial movement, the converter mechanism comprising:
  (i) a first member operatively connected to the input shaft, wherein the first member rotates at a same speed as the input shaft; and
  (ii) a second member operatively connected to the pinion shaft and rotating at a same speed as the pinion shaft, wherein a differential rotation between the speed of the input shaft and the pinion shaft results in axial movement of the second member;
(d) a plurality of reaction plates operatively connected to the pinion shaft;
(e) a plurality of friction plates operatively connected to the second member;
(f) a retaining ring operatively connected to the input shaft and positioned to receive axial forces on the first member generated by differential rotation of the first and second members;
(g) a reaction disk positioned proximate the friction and reaction plates;
(h) an end of shaft feature operatively connected to the input shaft, the end of shaft feature receiving axial forces from the reaction disk, wherein axial forces generated are all on the input shaft.

9. The disconnect of claim 8, further comprising:
(a) a Belleville spring positioned between the end of shaft feature and the reaction disk;
(b) the input shaft having a first diameter and a second, larger diameter;
(c) the second member having an end wall, wherein axial movement of the second member compressed the friction and reaction plates and transfers torque to the pinion shaft and axial movement of the second member is limited by the end wall contacting the larger diameter of the input shaft, wherein axial forces from the second member, while increasing by differential rotation, are on the input shaft proximate the second diameter.

* * * * *

UNITED STATES PATENT AND TRADEMARK OFFICE
CERTIFICATE OF CORRECTION

| | |
|---|---|
| PATENT NO. | : 7,591,355 B2 |
| APPLICATION NO. | : 11/513313 |
| DATED | : September 22, 2009 |
| INVENTOR(S) | : John Edward Hamrin and Brendan Reimer |

It is certified that error appears in the above-identified patent and that said Letters Patent is hereby corrected as shown below:

Title page, item [73]
Assignee: "TEAM Industries, Inc., Bagley, MA" should read --TEAM Industries, Inc., Bagley MN--

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,591,355 B2  Page 1 of 1
APPLICATION NO. : 11/513313
DATED : September 22, 2009
INVENTOR(S) : Hamrin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this

Twenty-first Day of September, 2010

David J. Kappos
*Director of the United States Patent and Trademark Office*